United States Patent [19]

Tsukada et al.

[11] Patent Number: 4,909,530
[45] Date of Patent: Mar. 20, 1990

[54] PROTECTING DEVICE FOR A PLASTIC FUEL TANK OF A MOTOR VEHICLE

[75] Inventors: Teruhisa Tsukada; Masao Fuse; Nobuharu Sakon; Masao Saito, all of Ohta, Japan

[73] Assignee: Fuji Jukogyo Kabushiki Kaisha, Tokyo, Japan

[21] Appl. No.: 216,898

[22] Filed: Jul. 8, 1988

[30] Foreign Application Priority Data

Jul. 28, 1987 [JP] Japan .................. 62-115588[U]

[51] Int. Cl.⁴ ........................................... B60K 13/04
[52] U.S. Cl. ................................. 180/296; 180/69.1; 180/304
[58] Field of Search ................. 180/296, 304, 69.4, 180/69.5, 69.1; 296/180.1

[56] References Cited

U.S. PATENT DOCUMENTS

| 3,963,087 | 6/1976 | Grosseau | 180/309 |
| 4,349,078 | 9/1982 | Shimada et al. | 180/69.1 |
| 4,569,551 | 2/1986 | Rauser et al. | 296/180.1 |
| 4,699,232 | 10/1987 | Nebu et al. | 180/296 |

FOREIGN PATENT DOCUMENTS 57-140226  8/1982  Japan .

Primary Examiner—Kenneth R. Rice
Attorney, Agent, or Firm—Martin A. Farber

[57] ABSTRACT

A flame cutoff plate is disposed between an exhaust pipe of an exhaust gas system of an engine and a side wall of the fuel tank, an inside of which becomes free of fuel earlier than other portions of the fuel tank so as to prevent heat transfer from the exhaust pipe to a portion of the tank which has its inside free of fuel when a fire breaks out in the exhaust pipe as a result of overheating or breaking on a rough road.

3 Claims, 2 Drawing Sheets

PROTECTING DEVICE FOR A PLASTIC FUEL TANK OF A MOTOR VEHICLE

BACKGROUND OF THE INVENTION

The present invention relates to a device for protecting a fuel tank made of synthetic resin from heat of a muffler and an exhaust pipe in an exhaust system of an automotive engine and from fire on roads.

Plastic fuel tanks are easily deformed by fire and heat, Japanese Patent Laid Open No. 57-140226 discloses a fuel tank, a body of which is covered with heatproof material to improve its heatproof and fireproof characteristics. In accordance with another means for protecting the tank from heat, a part of the exhaust system such as a muffler is covered with a plate for intercepting the heat. For example, in a device shown in FIG. 5, a muffler 2 is disposed under a car body 1 adjacent a fuel tank 3. A heat cutoff plate 4 encloses a main part of the muffler 2 to prevent the heat of the muffler from affecting the tank 3. In FIG. 6 showing another stucture of the tank and an exhaust pipe, a tank 3a comprises a deep portion and a shallow portion forming an indentation on the bottom thereof. An exhaust pipe 5 is disposed to pass the indentation under the shallow portion. The heat cutoff plate 4 is so placed as to surround the exhaust pipe in a space between the bottom of the shallow portion and the exhaust pipe.

However, the heat cutoff plate 4 acts to intercept only the heat of the exhaust system. Accordingly, when a fire breaks out in the exhaust system as a result of overheating, or breaks out on the road, the cutoff plate 4 can not prevent the tank from the flames, so that the flames touch side walls of the tanks 3 and 3a and the bottom of the shallow portion as shown by arrows in FIGS. 5 and 6. The flames heat the walls of the tank thereby deforming them, and in extreme cases, holes are formed on the walls. Especially, the side walls above the level of the fuel F such as gasoline are heated earlier than the lower portions of the side walls, because the inside of the upper side walls do not contact the fuel. In addition, the tank, which is made of synthetic resin, which has low heatproof characteristics, could lead to serious accidents.

SUMMARY OF THE INVENTION

The object of the present invention is to provide a device for protecting a synthetic resin tank from deformation and damage caused by heat and flames.

According to the present invention, there is provided a device for protecting a plastic fuel tank for an engine of a motor vehicle from heat from an exhaust system of the engine, comprising a flame cutoff plate disposed between an exhaust gas passage member of the engine and a wall of the fuel tank an inside of which becomes free of fuel earlier than other portions of the fuel tank, so as to prevent heat transfer from a member of the exhaust gas system to a portion of the tank which has its inside free of fuel when a fire breaks out in the exhaust gas passage member as a result of overheating or breaking on a rough road.

In an aspect of the present invention, the exhaust gas passage member is a muffler, and the flame cutoff plate is disposed above the muffler and between a side wall of the fuel tank and muffler.

The other objects and features of this invention will become understood from the following description with reference to the accompanying drawings.

DETAILED DESCRIPTION OF THE PREFERRED EMBODIMENTS

Figure 1:
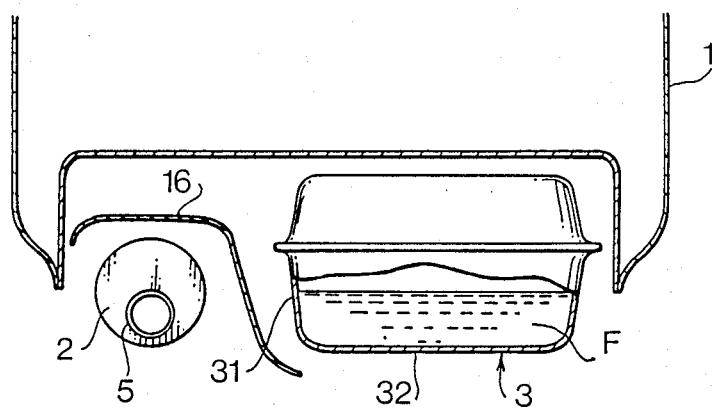
FIG. 1 is a schematic view of an arrangement of a fuel tank and a flame cutoff plate according to the present invention.
Figure 2:
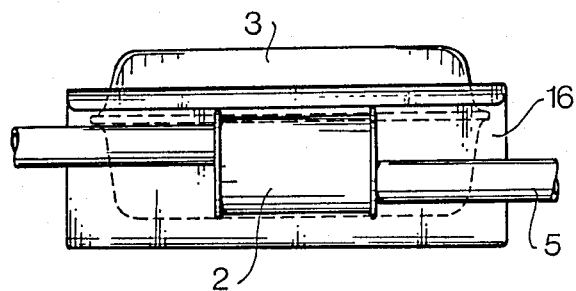
FIG. 2 is a side view of the device of FIG. 1.
Figure 5:
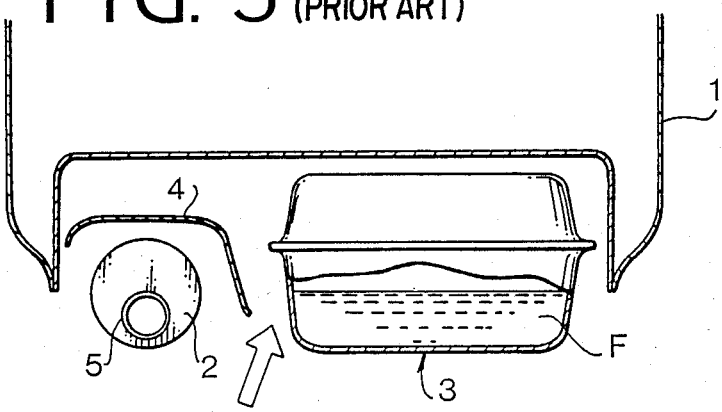
FIGS. 5 and 6 are schematic views showing arrangements of fuel tanks and heat prevention plates in the prior art.

Referring to FIGS. 1 and 2, the muffler 2 and plastic fuel tank 3 are disposed in the same way as in the prior art described in connection with FIG. 5. The muffler 2 and the tank 3 are separated from each other under a car body 1 by a flame cutoff plate 16 interposed therebetween. The plate 16 is disposed so as to cover an upper wall of the muffler 2 and to extend through the space between the muffler and a side wall 31 of the tank 3 and to terminate at a position near the bottom corner of the tank 3. Accordingly, the side wall 31 of the tank close to the muffler 2 is covered by the plate 16. As fuel F in the tank 3 is consumed, the fuel level becomes low so that the empty space inside the tank 3 increases. In other words, an upper portion of the inside of the tank becomes free of fuel earlier than a lower portion. Thus, in conventional cases, the side wall 31 tends to be overheated, since a portion where an inner surface of the wall makes contact with the fuel is reduced. However, in the present invention, the heat of the muffler 2 is blocked by the plate 16 and furthermore, the side wall 31 and the bottom 32 of the tank 3 are safe from flames which may rise from the vicinity of the underside of the muffler 2.

Figure 3:
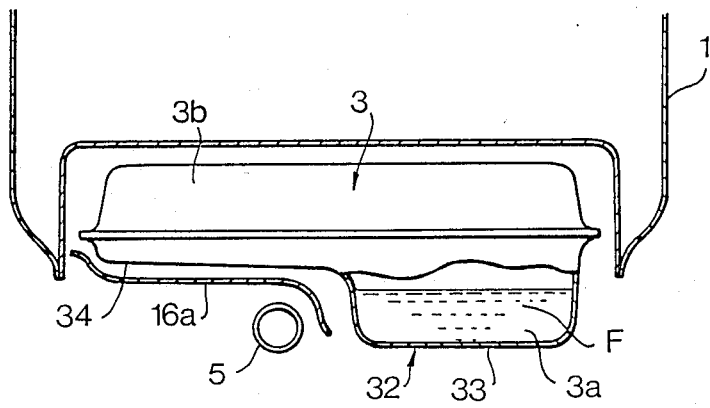
FIGS. 3 and 4 are schematic views showing arrangements of fuel tanks and flame prevention plates of second and third embodiments.
Figure 6:
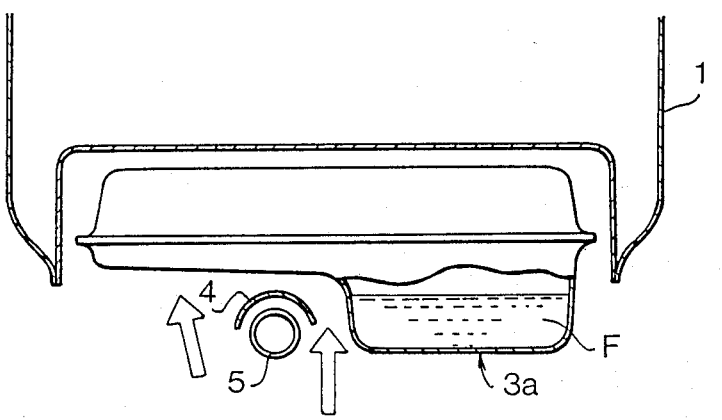

In a second embodiment shown in FIG. 3, the fuel tank 3 has a deep portion 3a and a shallow portion 3b and the exhaust pipe 5 and these parts are arranged in the samer manner as in the prior art of FIG. 6. Since the shallow portion 3b becomes free of fuel earlier than the deep portion 3a, a bottom 34 of the shallow portion 3b is apt to be overheated earlier than a bottom 33 of the deep portion 3a. Accordingly, a flame cutoff plate 16a is disposed in the space between the exhaust pipe 5 and the tank 3 covering the bottom wall 34 of the shallow portion 3b and the side wall of the deep portion 3a adjacent the exhaust pipe 5. Because the fuel F remains in the deep portion 3a, the bottom 33 thereof is not overheated. Therefore, the flame cutoff plate 16a for preventing deformation is not required for that portion.

Figure 4:
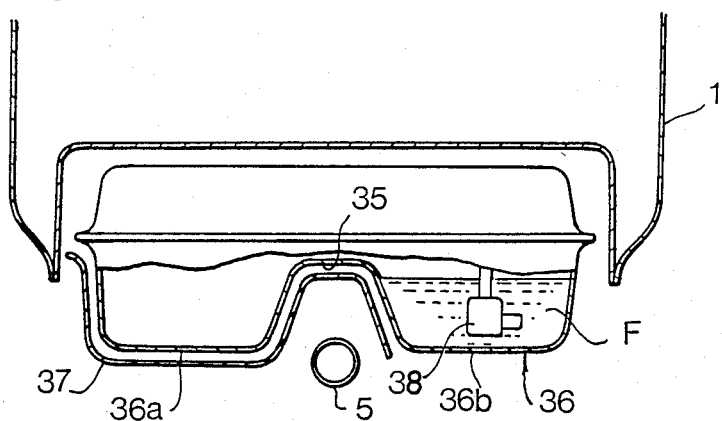

Referring to FIG. 4, a fuel tank 36 forms a central groove 35 on the underside thereof, thereby dividing the tank into two portions. In the groove 35, the exhaust pipe 5 is disposed. The tank is provided with a pump 38 for transferring fuel in the portion 36a to the portion 36b of the tank 3 and the fuel in the portion 36b is supplied to the engine. Accordingly, the first portion 36a becomes free of fuel before the second portion 36b. Thus, a bottom of the first portion 36a is protected by a flame cutoff plate 37 which is disposed so as to cover the entire bottom of the first portion 36a, and extends to the inner wall of the groove 35 adjacent the second portion 36b. Thus, a portion of the tank 3, which is eventually emptied of the fuel F and subject to overheating, is protected from heat of the exhaust pipe 5 and flame, thereby preventing deformation and damage to the tank.

In accordance with the present invention, the fuel tank is protected by the flame cutoff plate provided between the tank and a member or an exhaust pipe of an exhaust system. The plate covers the wall of a portion of the tank where the fuel is most prone to run out so that the portion, which tends to be deteriorated by the heat, is prevented from deformation and damage.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A device for protecting from flame a plastic fuel tank, the fuel tank being formed of an upper shell and a lower shell having a connection rim and containing fuel for an engine of a motor vehicle, said engine having an exhaust gas passage member under said vehicle, the improvement of said device which comprises:

flame cutoff plate means disposed between said exhaust gas passage member and a wall of the fuel tank and covering the connection rim of said upper and lower shells, the inside of said wall becoming free of fuel first and before other portions of said fuel tank become free of fuel during normal course of fuel consumption of fuel in said fuel tank by said engine;

said flame cutoff plate means being shaped in part substantially as an upside down U and disposed in a central recess formed between lateral side portions of said fuel tank, one of said latral side portions has said wall with said inside of said wall which becomes first free of fuel, said exhaust gas passage member being disposed in said central recess with said flame cutoff plate means extending above said exhaust gas passage member; and said flame cutoff plate means extending down, along a side wall of said other portions of said fuel tank which side wall defines said central recess, to and covering a corner formed by a bottom of said other portions of said fuel tank and said side wall, and said flame cutoff plate means terminating adjacent and lower than said corner at a free of end said flame cutoff plate means, leaving said bottom of said other portions of said fuel tank free from and uncovered by said flame cutoff plate means, the latter for preventing flame from reaching said wall and said side wall of said tank when a fire breaks out in said exhaust gas passage member.

2. The device according to claim 1 wherein the exhaust gas passage member is an exhaust pipe.

3. A device according to claim 1, further comprising fuel pump means in one of said lateral side portions for pumping the fuel therein from the other lateral side portion, said one lateral side portion supplying fuel directly to the engine, and said flame cutoff plate means extends completely under said other lateral side portion and along both lateral sides thereof.

* * * * *